(12) United States Patent
Smith et al.

(10) Patent No.: US 8,916,273 B2
(45) Date of Patent: Dec. 23, 2014

(54) GYPSUM BASED FORMULATIONS

(75) Inventors: Agnes Smith, Limoges Cedex (FR);
Thierry Chotard, Limoges Cedex (FR);
Cyrielle S. Dupas, Sarlat la canede (FR);
Ian Wilkes, Staffordshire (GB)

(73) Assignee: BPB Limited (GB)

( * ) Notice: Subject to any disclaimer, the term of this patent is extended or adjusted under 35 U.S.C. 154(b) by 517 days.

(21) Appl. No.: 12/598,230

(22) PCT Filed: Oct. 19, 2009

(86) PCT No.: PCT/GB2009/051397
§ 371 (c)(1),
(2), (4) Date: Nov. 21, 2011

(87) PCT Pub. No.: WO2010/046688
PCT Pub. Date: Apr. 29, 2010

(65) Prior Publication Data
US 2012/0058356 A1 Mar. 8, 2012

(30) Foreign Application Priority Data
Oct. 20, 2008 (GB) .................................. 0819079.5

(51) Int. Cl.
| | | |
|---|---|---|
| *B32B 23/04* | (2006.01) | |
| *B32B 29/00* | (2006.01) | |
| *C08L 3/04* | (2006.01) | |
| *C08B 31/00* | (2006.01) | |
| *C08J 3/24* | (2006.01) | |
| *C04B 28/14* | (2006.01) | |
| *C08L 3/02* | (2006.01) | |
| *C04B 111/00* | (2006.01) | |

(52) U.S. Cl.
CPC . *C04B 28/14* (2013.01); *C08L 3/04* (2013.01); *C08B 31/003* (2013.01); *C08J 3/24* (2013.01); *C04B 28/147* (2013.01); *C04B 2111/0062* (2013.01); *C08L 3/02* (2013.01)
USPC ........................................ 428/532; 428/537.7

(58) Field of Classification Search
None
See application file for complete search history.

(56) References Cited

U.S. PATENT DOCUMENTS

| | | |
|---|---|---|
| 3,640,756 A | 2/1972 | Beersma et al. |
| 3,956,272 A * | 5/1976 | Tixier .......................... 536/55.1 |
| 2005/0126437 A1 | 6/2005 | Tagge et al. |
| 2005/0261401 A1* | 11/2005 | Wood et al. ..................... 524/99 |

FOREIGN PATENT DOCUMENTS

| | | |
|---|---|---|
| EP | 1510527 | 2/2005 |
| JP | 2005089288 | 4/2005 |
| WO | 02/088188 | 11/2002 |
| WO | 03/040055 | 5/2003 |

* cited by examiner

*Primary Examiner* — Sheeba Ahmed
(74) *Attorney, Agent, or Firm* — GrayRobinson, P.A.; Michael J. Colitz, III

(57) ABSTRACT

The formulation for making plasterboard with paper cover sheets comprises finely divided gypsum, a minor amount by weight of starch and, as crosslinking agent for the starch, a tri-functional reactive s-triazine having substituents at positions 2, 4 and 6 of the triazine ring which are reactive with the starch. A preferred crosslinking agent is 2,4,6-trichloro-s-triazine, which is preferably partially reacted with the starch before further reaction with the paper cover sheets for the plaster board.

3 Claims, 1 Drawing Sheet

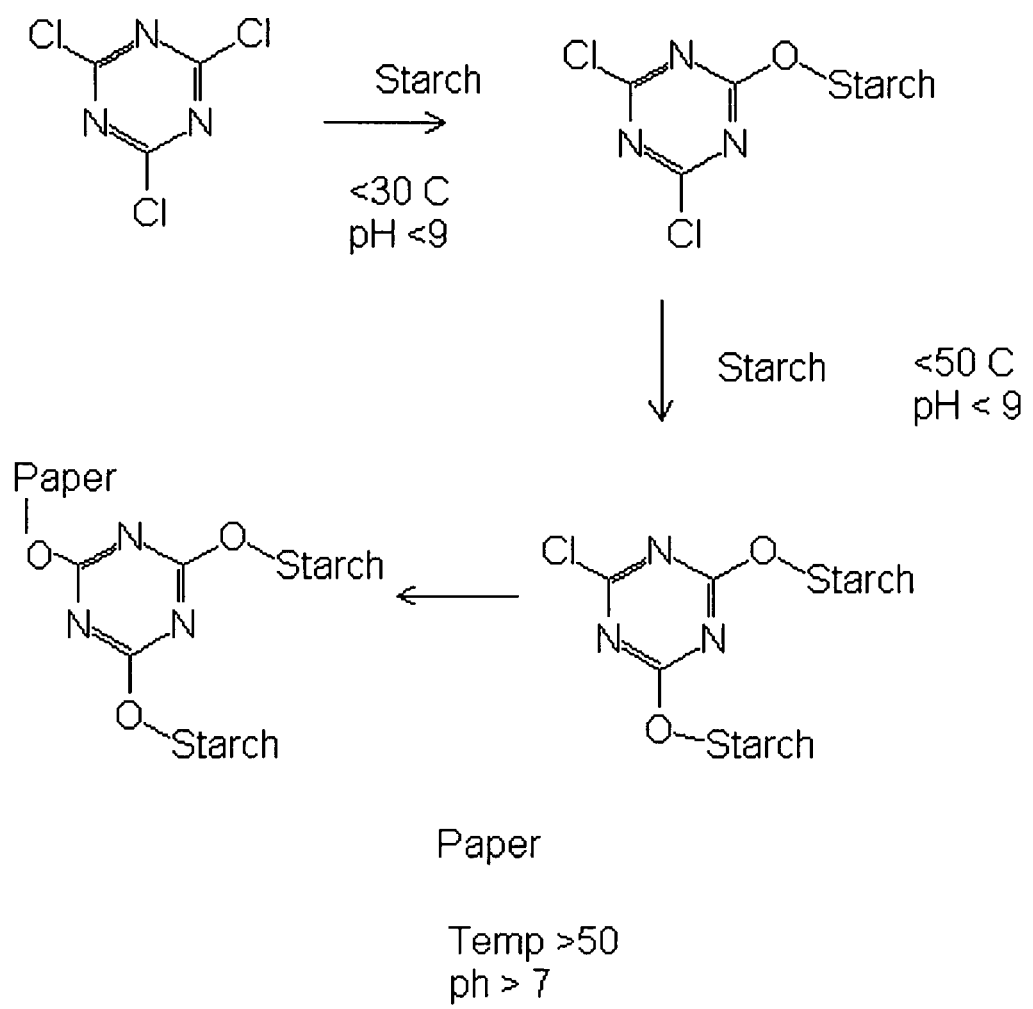

GYPSUM BASED FORMULATIONS

PRIORITY DATA

This application is a continuation of and claims priority under 35 U.S.C. §371 to International Application No. PCT/GB2009/051397 filed on Oct. 19, 2009, which claim priority from GB0819079.5 filed on Oct. 20, 2008. The contents of both aforementioned applications are incorporated herein by reference.

The present invention concerns gypsum-based formulations which can be used to form plaster products for construction purposes, for example in the manufacture of plaster board or the like.

Gypsum is a naturally occurring form of calcium sulphate, in the form of a stable dihydrate ($CaSO_4.2H_2O$). The term "gypsum", as used herein, means calcium sulphate in that stable dihydrate state, and includes the naturally occurring mineral, the synthetically derived equivalents, and the dihydrate material formed by the hydration of stucco (calcium sulphate hemihydrate) or anhydrite.

The properties of gypsum make it highly suitable for use in industrial and building plasters and other building products such as gypsum wallboard. It is a plentiful and generally inexpensive raw material which, through successive steps of dehydration and rehydration, can be cast, moulded or otherwise formed to useful shapes. For example, gypsum wallboard; also known as plasterboard or drywall, is formed as a set gypsum core sandwiched between paper cover sheets.

Gypsum is generally prepared for use as plaster by grinding and calcining at relatively low temperature (such as from about 120 to 170° C.), generally at atmospheric pressure. This results in partially dehydrated gypsum, typically in the form of the beta crystalline form of the hemihydrate, which generally has an irregular crystal structure. The beta hemihydrate may be used as a building or construction material by mixing it with water to form an aqueous stucco slurry, paste or dispersion, and then allowing the slurry to set by recrystallisation from the aqueous medium. Such setting is typically rapid in the production of plasterboard (typically within 2.5 to 10 minutes).

It is known to use starch in gypsum formulations for the manufacture of plaster board or wall board. Chemically modified or unmodified starches are added to a gypsum-based stucco formulation; the formulation is then applied between liner sheets (typically of paper) and cured between the sheets. The starch helps the adhesion of the gypsum to the liner sheets.

It is further known to use cross-linking agents for starch employed in such boards. For example, WO 03/040055 discloses various cross-linking agents for starch, including sodium metaborate, potassium tripolyphosphate, borax, sodium metaborate hydrate, boric acid, magnesium oxide, and/or type N hydrated lime.

According to the present invention, there is provided a gypsum formulation, which comprises finely divided gypsum, a minor amount by weight of starch and, as crosslinking agent for the starch, a tri-functional reactive s-triazine having substituents at positions 2, 4 and 6 of the triazine ring which are reactive with the starch.

The three substituents may be the same, so that the s-triazine is symmetrical, although in some embodiments, more than one reactive substituents may be predent. The preferred symmetrical s-triazine has chlorine as all three substituents, when the crosslinking agent is 2,4,6-trichloro-s-triazine (also known as 2,4,6-trichloro-1,3,5 triazine), which has the following formula:

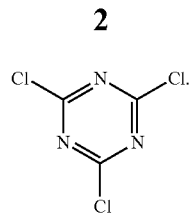

Other possible reactive substituents are fluorine, amino, and thiol groups. For example, the substituents may be amino groups (including heterocyclic amines such as a pyridine group like nicotinamide); fluorine; or an aromatic or aliphatic thiol. Amine substituents can enable enhanced pH control; fluorine substituents increase reactivity; and thiol substituents can enhance solubility.

As indicated, a preferred such crosslinking agent is 2,4,6-trichloro-s-triazine, which is known in general terms as a crosslinking agent for polysaccharides (see, for example, U.S. Pat. No. 3,956,272). However, it has not previously been proposed as a cross-linking agent for starch used in plaster formulations.

The crosslinking agent is preferably present in an amount of 0.5 to 4% by weight, based on the weight of the starch, and preferably undergoes a partial reaction with the starch (at low temperature) prior to mixing with the gypsum, as will now be explained.

2,4,6-trichloro-s-triazine is a monomer having three reactive functional groups, namely the three chlorine substituents. At neutral pH values and low temperatures (such as 3 to 30° C.), two of the functional groups react with hydroxyl groups of starches and dextrins, resulting in increased starch crosslinking.

At temperatures above 50° C. the remaining reactive functional group of the triazine reacts further, causing formation of crosslinks with other starch chains or with other hydroxyl bearing polymers (starches, dextrose, cellulose, gums and other natural products, and, for example, polymers such as PVA). The cross linking increases strength and fixes the starch. This reaction process is schematically illustrated in the accompanying drawing (FIG. 1), which illustrates the sequence of reactions between 2,4,6 trichloro-s-triazine and starch.

During a conventional plaster board production process, temperatures rarely elevate above 50° C. until the board reaches the drier section. According to the invention therefore, when the formulation is used in plaster board manufacture, the passage through the drier can aid reaction of the third reactive group of the crosslinking agent, thereby resulting in enhanced bonding after the drying stage to the liner sheets and to materials such as PVA which may be present.

The formulation according to the invention preferably contains starch in an amount of not more than 10% by weight of the formulation, more preferably from 0.5 to 1.5% by weight.

The starch used in the formulation according to the invention may be native (unmodified) starch, or chemically modified starch; when it is chemically modified it may, for example be acid-modified and/or enzymatically modified. The starch may be obtained from any suitable plant source, such as from tubers, tapioca or cereal—such as rice or corn). It is preferably in finely divided particulate form, such as in the form of flour. As indicated above, the starch may be partially reacted with the crosslinking agent before mixing with the gypsum.

The starch may be intimately mixed with the gypsum, in the form of a powder mix, prior to mixing of the gypsum formulation with water as will be described below, or it may be mixed with the gypsum at the same time as it is mixed with water.

The gypsum used in the formulation according to the invention is generally calcined; it may be a crushed and ground natural material or derived from an industrial source. It is preferably calcium sulphate hemihydrate in calcined solid beta crystalline form.

In use, the gypsum formulation according to the invention, in dry form, is to be mixed with water to form a slurry, paste or dispersion which is then set, for example by heating in a drier. The water employed to make the slurry is typically ground water or tap water, which may have been filtered.

The pH of the slurry, paste or dispersion formed from the formulation according to the invention is typically in the range 6.5 to 9.5.

At least some of the water may be in the form of a pre-generated aqueous foam, such as is conventionally added to gypsum slurries so as to reduce the weight of the resulting final board. Various types of foaming agent may be used in such a foam; amongst these are ionic surfactants and non-ionic surfactants.

Other non-deleterious materials, adjuvants and ingredients may, when appropriate, be present either in the water or mixed with the gypsum formulation according to the invention. Such non-deleterious materials may include optional further ingredients, such as water reducing agents, moisture repellents (such as silicone oils or waxes), set accelerators and retarders, deformation inhibitors (such as anti-sagging agents), anti-shrink additives, recalcination inhibitors, foam stabilisers, bactericides, fungicides, pH adjusters, colouring agents, fire retardants and fillers (such as particulate mineral material or plastics, which may in some embodiments be in expanded form).

Especially when the formulation according to the invention is used in the production of plaster board, the aqueous slurry, paste or dispersion made therefrom may contain fibre reinforcement, such as glass fibres (typically cut fibres).

The plaster board according to the invention is generally produced by mixing water with the formulation according to the invention and feeding the resulting slurry between spaced surface reinforcements or liner sheets so as to form a sandwich structure, and then allowing the slurry to set between the surface reinforcements or liner sheets.

In the method according to the invention, the slurry is preferably set by heating the slurry to a temperature of at least 50° C., preferably by heating in a drier as indicated above.

When plaster board is produced from the formulation according to the invention, the board may be with or without surface reinforcement, facing or liner sheets; when surface reinforcement, facing or liner sheets are used, they may, for example, be of water-permeable textile such as fibre scrim, fibre mesh or paper. Paper is preferred because, as indicated above, it is cellulosic and has hydroxyl groups able to react with the crosslinking agent to result in enhanced bonding to the starch; when a textile is set, it too is preferably cellulosic.

The present invention extends to plaster board comprising a set aqueous gypsum slurry, paste or dispersion produced from a formulation according to the invention, and the use of a formulation according to the invention in the production of such plaster board.

Certain features of the present invention will now be illustrated with reference to the following example.

EXAMPLE 2,4,6-trichloro-s-triazine (1 g) was dissolved in acetone (10 ml) and added to a suspension of 500 g deionised water at 6-7° C. containing 25 g corn starch (Sigma). The pH of the mixture was previously set at about 1 with sulphuric acid (1M). After 15 minutes, the suspension was set at pH neutral (pH 6 to 8) using 1M sodium hydroxide solution. The resulting suspension was agitated for a further 30 minutes (up to 45 minutes), keeping the pH at neutral by using more sodium hydroxide.

The starch was then precipitated using acetone and filtered to achieve a dry white powder. The starch was used in an amount of 0.5% w/w in 500 g stucco (beta) water mix at water/plaster ratio of 0.7:1 (Mix B) or in an amount of 1.5% w/w (Mix C). The resultant slurry was poured into prism moulds. After hydration the prisms were taped and placed in a drying oven at 180° C. C for 12 minutes.

The resulting plaster prisms were placed in a controlled atmosphere before testing for strength on a Zwick mechanical test station. The flexural strength of the resulting prisms was compared with similar prisms without starch.

The paper was tested using a 1 to 5 scale of wet and dry bond test. Each measurement was repeated 30 times to obtain significant results. The following Table summarises the results for flexural tests and shows that flexural strength was improved significantly with 0.5% of crosslinked starch and even more significantly with 1.5% of crosslinked starch.

TABLE

| Mix | Ingredients | Min improvement | Max improvement | Average |
|---|---|---|---|---|
| A1 (control) | 0.5% starch | 4.90% | 23.70% | 13.90% |
| A2 (control) | 1.5% starch | 3% | 13.3% | 5.15% |
| B | 0.5% starch plus Triazine | 6.80% | 28.80% | 17.50% |
| C | 1.5% starch plus Triazine | 22.60% | 44.10% | 33.00% |

In the above Table, references to "Triazine" are to 2,4,6-trichloro-s-triazine. Mixes A1 and A2 are controls (without any triazine crosslinking agent), but containing, respectively 0.5% starch and 1.5% starch.

Although the above example demonstrates use of the formulations according to the invention in plaster blocks (prisms), comparable advantages can be obtained if a slurry made from the formulation is sandwiched between opposed surface reinforcement, facing or liner sheets to form a plaster board.

The invention claimed is:

1. A gypsum board produced from a gypsum formulation comprising finely divided gypsum, a minor amount by weight of starch and, as crosslinking agent for the starch, a tri-functional reactive s-triazine having substituents at positions 2, 4 and 6 of the triazine ring which are reactive with the starch, wherein the crosslinking agent is partially reacted with the starch prior to mixing with the gypsum.

2. The gypsum board according to claim 1, wherein the crosslinking agent is 2,4,6-trichloro-s-triazine.

3. The gypsum board according to claim 1, wherein the finely divided gypsum comprises calcium sulphate hemihydrate in calcined solid beta crystalline form.

* * * * *